Patented Mar. 10, 1925.

1,528,766

UNITED STATES PATENT OFFICE.

JOHN HARRIS, OF CLEVELAND, OHIO, ASSIGNOR TO JAMES R. ROSE, OF EDGEWORTH, PENNSYLVANIA.

GASEOUS FUEL.

No Drawing.   Application filed May 28, 1923. Serial No. 642,088.

*To all whom it may concern:*

Be it known that I, JOHN HARRIS, a citizen of the United States, residing at Cleveland, in the county of Cuyahoga and State of Ohio, have invented a certain new and useful Improvement, in Gaseous Fuel, of which the following is a full, clear, and exact description.

This invention relates to gaseous fuel, and more particularly to a gaseous fuel which, used in combination with oxygen, is especially adapted for the purpose of cutting and welding metals.

It is the general object of the invention to provide a gaseous fuel which is relatively inexpensive and which will enable the cutting and welding to be performed in a most efficient manner.

As is well known, acetylene has long been employed for welding and cutting purposes. Its use, however, is attended with the disadvantages that it cannot be shipped in tanks, owing to its liability to dissociation under the pressures which obtain in such tanks; and it is expensive of production.

I effect a material reduction in the cost of gaseous fuel over that of acetylene and obtain an efficient welding and cutting of metals by my gaseous fuel, which is formed by mixing acetylene and butane in the proportions of not materially less than 10 parts and not materially more than 50 parts by volume of acetylene to not materially more than 90 parts and not materially less than 50 parts by volume of butane.

A mixture of these gases possesses the advantage that the fuel thus formed may be compressed into tanks without the dissociation of the acetylene, as the latter will be diffused throughout the butane; the greater the proportion of butane to acetylene, the higher may be the compression to which the mixture is subjected without dissociation of the acetylene.

The gaseous fuel produced by the mixture herein set forth will give a visible reducing cone which is longer than that produced by the combustion of acetylene alone with oxygen; it reduces to a minimum the danger of the flame flashing back into the tanks, since the igniting point of the fuel mixture is higher than that of acetylene alone. Furthermore, it produces a greater flame volume, with greater heat units, than is produced by the combustion of acetylene alone. Finally, as has been pointed out hereinbefore, the fuel mixture is considerably more economical of production than is acetylene alone, due to the materially lower cost of butane.

While the gaseous fuel described herein can be used advantageously for welding purposes and for heating large masses of metal, it is especially useful when used for the cutting of metals, the butane constituent serving to raise the igniting point of the acetylene and to enable this result to be accomplished by the use of the cheaper butane, in large proportion.

Having thus described my invention, what I claim is:

A gas especially useful for cutting purposes consisting of a mixture of acetylene and butane in proportions of from not materially less than 10 parts to not materially more than 50 parts by volume of acetylene, to from not materially greater than 90 parts to not materially less than 50 parts by volume of butane.

In testimony whereof, I hereunto affix my signature.

JOHN HARRIS.